United States Patent
Klebosky, Jr. et al.

(10) Patent No.: US 12,493,881 B1
(45) Date of Patent: Dec. 9, 2025

(54) MACHINE LEARNING MODEL FOR SELF-SERVICE TRANSACTION ANOMALY RESOLUTION

(71) Applicant: Wells Fargo Bank, N.A., San Francisco, CA (US)

(72) Inventors: Thomas A. Klebosky, Jr., Scottsdale, AZ (US); Daniel Ray Martin, Concord, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 447 days.

(21) Appl. No.: 16/716,330

(22) Filed: Dec. 16, 2019

Related U.S. Application Data (60) Provisional application No. 62/783,318, filed on Dec. 21, 2018.

(51) Int. Cl.
*G06Q 20/40* (2012.01)
*G06F 16/248* (2019.01)
(Continued)

(52) U.S. Cl.
CPC ....... *G06Q 20/4016* (2013.01); *G06F 16/248* (2019.01); *G06N 3/08* (2013.01); *G06N 20/00* (2019.01)

(58) Field of Classification Search
CPC ............ H04L 63/1441; H04L 63/1416; H04M 15/47; H04M 2215/0148; G06Q 20/4016;
(Continued)

(56) References Cited

U.S. PATENT DOCUMENTS

| | | | |
|---|---|---|---|
| 6,601,055 B1 * | 7/2003 | Roberts .................... | G06N 7/01 706/45 |
| 7,774,191 B2 * | 8/2010 | Berkowitz ............. | G06Q 40/06 703/23 |

(Continued)

FOREIGN PATENT DOCUMENTS

| | | | | |
|---|---|---|---|---|
| CN | 101512957 | * | 8/2009 | ........... G06Q 20/382 |
| WO | WO-2018152534 A1 | * | 8/2018 | ....... G06F 16/24578 |

OTHER PUBLICATIONS

An Intuitive Understanding of Word Embeddings: From Count Vectors to Word2Vec by analytics (Year: 2017).*

(Continued)

*Primary Examiner* — Christine M Behncke
*Assistant Examiner* — Mary M Gregg
(74) *Attorney, Agent, or Firm* — SCHWEGMAN LUNDBERG WOESSNER, P.A.

(57) ABSTRACT

A method may include determining suspicious activity with respect to a user account, the suspicious activity including at least one transaction on the user account; transmitting a notification to a computing device associated with the user account, the notification identifying the suspicious activity and including a link into an application installed on the computing device to confirm the suspicious activity; receiving, from the application, an indication that the notification was activated on the computing device; and in response to the indication: selecting a subset of queries of a plurality of queries to present on a display device of the computing device via the application; receiving answers to the subset of queries via the application; processing the answers to generate a resolved status of the suspicious activity.

15 Claims, 11 Drawing Sheets

(51) Int. Cl.
*G06N 3/08* (2023.01)
*G06N 20/00* (2019.01)

(58) Field of Classification Search
CPC ............ G06Q 20/40; G06N 3/02; G06N 3/08; G06N 20/00; G06F 17/16
See application file for complete search history.

(56) References Cited

U.S. PATENT DOCUMENTS

| | | | | |
|---|---|---|---|---|
| 9,032,498 | B1* | 5/2015 | Ben Ayed | G06F 21/35 726/9 |
| 9,047,473 | B2* | 6/2015 | Samuelsson | H04L 9/3273 |
| 10,567,237 | B1* | 2/2020 | Powell | H04L 41/16 |
| 10,572,521 | B2* | 2/2020 | Franceschini | G06F 16/951 |
| 10,937,547 | B2* | 3/2021 | Ramezani | G06F 1/163 |
| 2007/0266257 | A1* | 11/2007 | Camaisa | H04L 63/0838 713/182 |
| 2010/0036783 | A1* | 2/2010 | Rodriguez | G06F 21/316 706/15 |
| 2011/0238564 | A1* | 9/2011 | Lim | G06Q 20/3223 705/38 |
| 2017/0124483 | A1* | 5/2017 | Huang | G06N 20/10 |
| 2018/0089424 | A1* | 3/2018 | Yang | G06F 21/52 |
| 2018/0108268 | A1* | 4/2018 | Singh | G09B 7/08 |
| 2019/0043201 | A1* | 2/2019 | Strong | G06V 10/96 |
| 2019/0050368 | A1* | 2/2019 | Chen | G06N 20/10 |
| 2019/0050709 | A1* | 2/2019 | Yang | G06V 10/464 |
| 2019/0095992 | A1* | 3/2019 | Soh | G07F 19/20 |

OTHER PUBLICATIONS

How to Store text file into a vector by overstack; (Year: 2017).*
Create std: vector in place from raw data- overstack (Year: 2017).*
A library for efficient similarity search by Faiss (Year: 2017).*
CityVoyager: An Outdoor Recommendation System by Takeuchi et al (Year: 2006).*

* cited by examiner

MACHINE LEARNING MODEL FOR SELF-SERVICE TRANSACTION ANOMALY RESOLUTION

CROSS-REFERENCE TO RELATED APPLICATION

This patent application claims the benefit of U.S. Provisional Patent Application No. 62/783,318, filed Dec. 21, 2018, which is incorporated by reference herein in its entirety.

BACKGROUND

People often have numerous accounts (e.g., financial, e-mail, merchant, etc.). It is common for the companies associated with these accounts to transmit a message to a customer if the company believes there has been suspicious activity on the account not attributable to the user. For example, a bank may alert a user that a purchase has been made that does not match previous purchase patterns made by a user. In order to resolve the issue, a user often must call the company and speak with a customer service representative.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 2-9 are screenshots of resolving a suspicious transaction, according to various examples

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an API or other program communication method. Similarly, the variables may be assumed to have a default values should a specific value not be described. User interfaces may be provided for an end-user or administrator to edit the variable values in some instances.

A number of resources (both human and computing) are used to resolve instances of suspicious activity on users' accounts. Suspicious activity may be a transaction that was not authorized by a user (e.g., a purchase). The most common way to resolve suspicious activity is for the affected user to call the company associated with their account. The problem with a call-in based system is that there is often a great deal of delay between the suspicious activity and whenever the user can call in. This leads to the possibility of other unauthorized transactions being made on the user's account before the user can contact the company.

Some companies offer alert-based systems that send a text message (e.g., using short message service) that indicates a possible unauthorized purchase on the user's account. Yet, the message does not offer the ability for the user to resolve the issue. For example, there may be an option (e.g., send a message back) indicating the transaction was not authorized, but in order to fully resolve the issue a call is generally needed. The same problem occurs if the company offers an application that may be installed a mobile device of a user. For example, a push notification may be transmitted, but a call may be still be required to resolve the issue.

Furthermore, once a user makes a call, there can still be considerable delay (e.g., a week) in actually resolving the issue. For an unauthorized transaction, there may be three determinations from the call (1) the user receives full credit back the account (2) the user receives provisional credit; or (3) a set of questions must be answered before a decision may be made. The delay most often comes from the user needing to answer questions because the user may not be able to answer the questions right away or a customer service representative (CSR) may be available resulting a lot of back and forth. Then, the CSR or a decision engine may need to process the answers and make a decision.

Described herein is a system and related methods that reduce the resources needed to resolve suspicious activity. For example, instead of relying on a CSR and the accompanying computing resources, a user may leverage an application installed on the user's computing device to answer any needed questions. There are many technical benefits and improvements to suspicious activity resolving systems that are realized by using such an application. For example, because many user computing devices include biometric login mechanisms, different options may be presented to a user that would not be possible without such biometric login methods. Additionally, a machine learning model may be trained and used to determine what questions are needed to most efficiently (e.g., use less computing resource) resolve an instance of suspicious activity.

Figure 1:
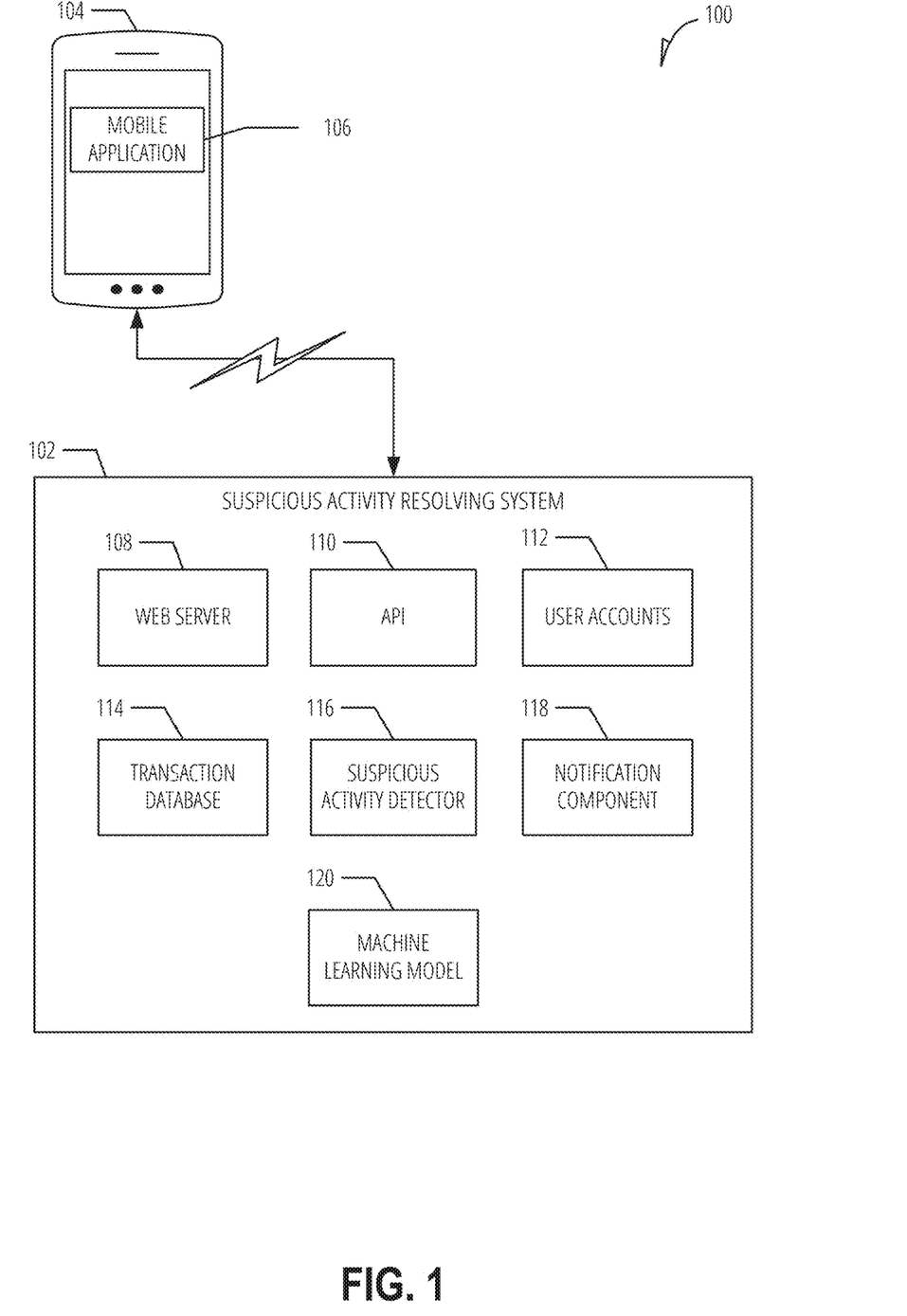
FIG. 1 is a system overview diagram, according to various examples.

FIG. 1 is a system overview diagram, according to various examples. System overview diagram 100 includes computing device 104 which may include mobile application 106. Computing device 104 may be a mobile device, such as a mobile phone in various examples. Computing device 104 may communicate with suspicious activity resolving system 102 over a network (not shown). Suspicious activity resolving system 102 may include web server 108, API 110, user accounts 112, transaction database 114, suspicious activity detector 116, notification component 118, and machine learning model 120.

For illustration purposes, suspicious activity resolving system 102 is illustrated as set of separate functional units (e.g., web server 108, suspicious activity detector 116, notification component 118, etc.). However, the functionality of multiple functional units may be performed by a single unit. A functional unit may represent computer program code that is executable by a processing unit (e.g., a core of a general-purpose computer processor, a graphical processing unit, an application specific integrated circuit, etc.) The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure. Suspicious activity resolving system 102 may be part of a larger set of resources for an organization in various examples. In some examples, all or part of suspicious activity resolving system 102 is provided as service.

Mobile application 106 may be an application provided (e.g., via an app store or direct download from a website) by the same organization or company that manages suspicious activity resolving system 102. As a continuing example, mobile application 106 may be an application provided by a financial institution. A user may use mobile application 106 to view balance information, past transactions, transfer money, etc. As detailed more below, mobile application 106 may be configured using business rules to present questions to a user about suspicious activity without requiring a call.

Mobile application 106 may communicate with suspicious activity resolving system 102 over a network (not shown). For example, mobile application 106 may format data requests according to function calls defined by API 110. Web server 108 may process the received request and transmit data back to computing device 104 for display by mobile application 106. In some examples, mobile application 106 may be a web application. A web application may provide user interface (UI) components that are rendered on a display device of a computing device such as computing device 104. The user may interact (e.g., select, move, enter text into) with the UI components, and, based on the interaction, the web application may update one or more portions of the web page. A web application may be executed in whole, or in part, locally on a client device.

A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

Because of the sensitive nature of data stored within suspicious activity resolving system 102 and operating on computing device 104 various security measures may be used to protect data at rest and in transmit. For example, API 110 may use tokens or API keys to ensure only authorized parties may retrieve transaction data from suspicious activity resolving system 102. Additionally, data transmitted over the network may use a cryptographic protocol, such Secure Socket Layer (SSL) or Transport Layer Security (TLS). As a further security precaution, the transmitted data itself may be encrypted, separately from the SSL or TLS encryption. Public-key infrastructure (PKI) may be leveraged for SSL/TLS as well as the separate data encryption.

User accounts 112 may store user profile data on a set of accounts. For example, a user profile may include a username and password (hashed), identifications of computing devices that have mobile application 106 installed, contact information (e.g., phone number, etc.), and account numbers for various financial accounts of the user (e.g., checking, savings, etc.). A user profile may also have an identification beyond the username that may be used internally to identify a user. This identification may be used when a transaction record is created and stored in transaction database 114 in some examples.

Transaction database 114 may store data on transactions associated with a user account. A transaction may include a date, an amount, a type (e.g., credit, debit), and a location of the transaction, a user identification, an account number, a transaction number, among other items of information. A transaction may also include a security flag that indicates whether or not the transaction has been flagged as suspicious.

Suspicious activity detector 116 may process each transaction to determine if it is suspicious or not. The precise manner of why a transaction may be flagged as suspicious may not affect the performance of the other components in suspicious activity resolving system 102; however, one method may be to compare a transaction to past behavior of an associated user. For example, one relatively simple method may be to flag a transaction if it is made on an account of a user for an amount that is more than two standard deviations above the average amount it may be flagged. More sophisticated techniques may be used that use a number of factors to for the determination such as location, time of day, estimated location of the user, and the location of a previous transaction.

Notification component 118 may transmit a notification (e.g., a push notification) to computing device associated with a user when suspicious activity detector 116 flags a transaction. The push notification may be associated with mobile application 106. Accordingly, when a user activates (e.g., clicks) the push notification, mobile application 106 may open and, after authentication, answer questions about the suspicious transaction. In various examples, there are two stages of questions. The first stage of questions may be to confirm that the user does not recognize the transaction and actions to take with respect to account access (e.g., cancelling a credit card, etc.). The second stage of questions may relate to resolving the status of the transaction in order to obtain permanent or provisional credit or requiring intervention with a customer support representative.

Machine learning model 120 may output what questions to ask a user with respect to the second stage of questions. The structure of machine learning model 120 may take a variety of forms, such as neural network with an input layer, one or more hidden layers, and an output layer. A training set for machine learning model 120 may be compiled using past suspicious transaction information (e.g., information stored in transaction database 114), user information (e.g., information from user accounts 112), and questions asked by CSRs to resolve the suspicious transaction. For example, an input feature vector may be generated with the amount of the suspicious transaction, an encoding of a location of the transaction, an encoding of whether a user had previously had a suspicious transaction in the past 30 days, etc. The output layer of machine learning model 120 may have nodes for each possible question.

To illustrate the above, consider a simplified example in which there are only two dimensions of the input feature vector and four possible questions. An item of training data may include the amount of the suspicious transaction and an encoding of the location of the transaction (e.g., 1 is USA, 2, is Canada, 3 is Mexico, etc.). Now, consider that previously a suspicious transaction occurred for $2,000 in Mexico and the CSR asked questions one and three. Thus, the input feature vector would be [2000, 3] and the expected output would be [1, 0, 1, 0].

The input feature vector and expected output may be used to train the machine learning model 120 using techniques as known in the art—e.g., if the neural network is a feedforward neural network, a back-propagation algorithm may be used. With each item of training data, the weights of a hidden layer(s) of neurons may be updated. Accordingly, after a period of time of training, machine learning model 120 may be used to identify which questions to ask a user. For example, for an input of [100, 1] machine learning model 120 may output [0.87, 9, 1, 2] indicating that there is a high probability (e.g., above 80%) that questions one and two would be asked for a suspicious transaction of 100 dollars in the United States. Thus, instead of having a user answer all four questions, only questions 1 and 2 may be needed.

Figure 2:
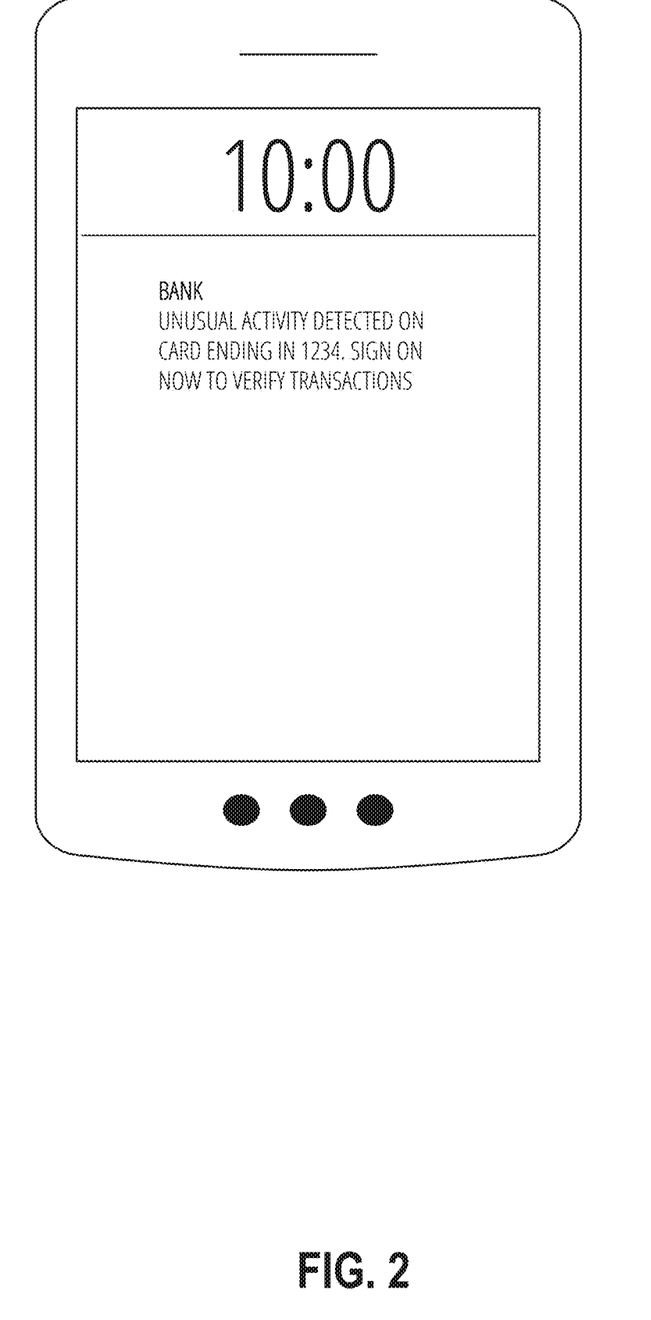

FIGS. 2-9 are screenshots of resolving a suspicious transaction, according to various examples. The screenshots may be presented on a display device of computing device 104 in various examples. The screenshot of FIG. 2 presents a push notification that unusual (e.g., suspicious) activity was detected on an account of a user. The push notification may have been transmitted by notification component 118 in response to suspicious activity detector 116 identifying a suspicious transaction. The push notification may limit the amount of information displayed about the transaction (e.g., hides the full account number) because the computing device may be viewable by others beyond the user. The push notification may also include a deep link into mobile application 106. The deep link may bypass the traditional information (e.g., balance) displayed at login and take the user into a suspicious activity workflow.

Figure 3:
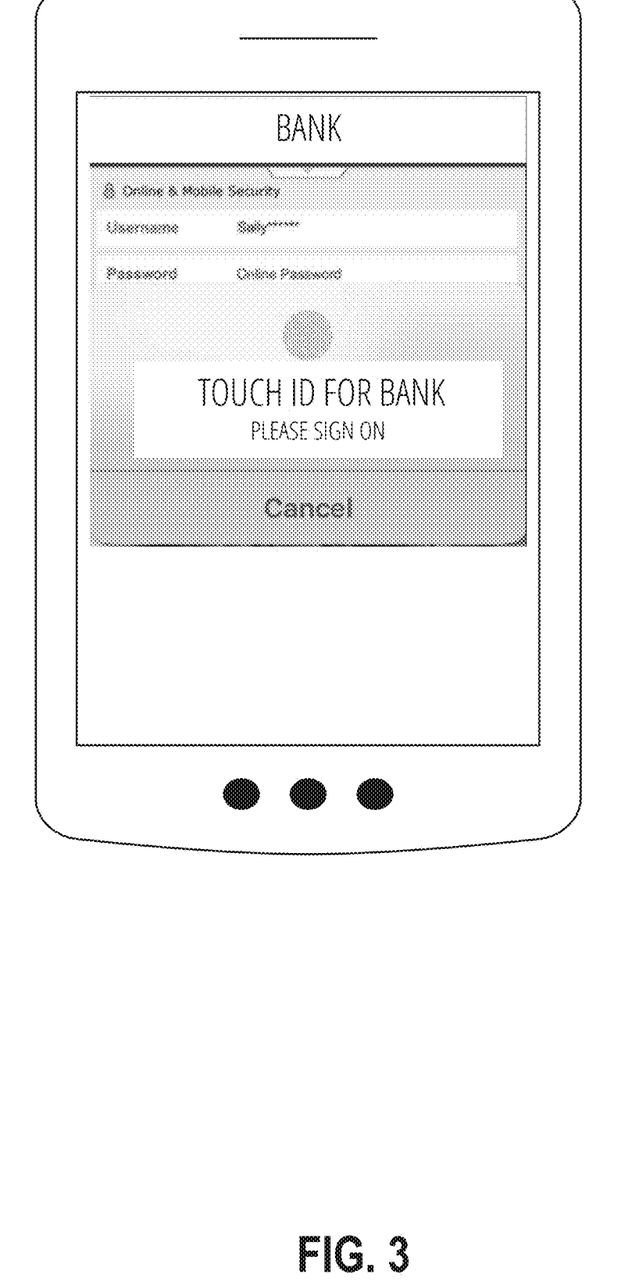

A user may click on the notification and be presented with the login interface on FIG. 3 to sign into a financial institution. The login interface may be presented by mobile application 106. The user may be required to login even if the user had previously been logged into mobile application 106 in case computing device 104 had been stolen. After successfully logging into mobile application 106, a prompt may be presented (not illustrated) that explains that there was suspicious activity on an account associated with the user and that the user may proceed to review the transaction to confirm it was not made by the user.

Figure 4:
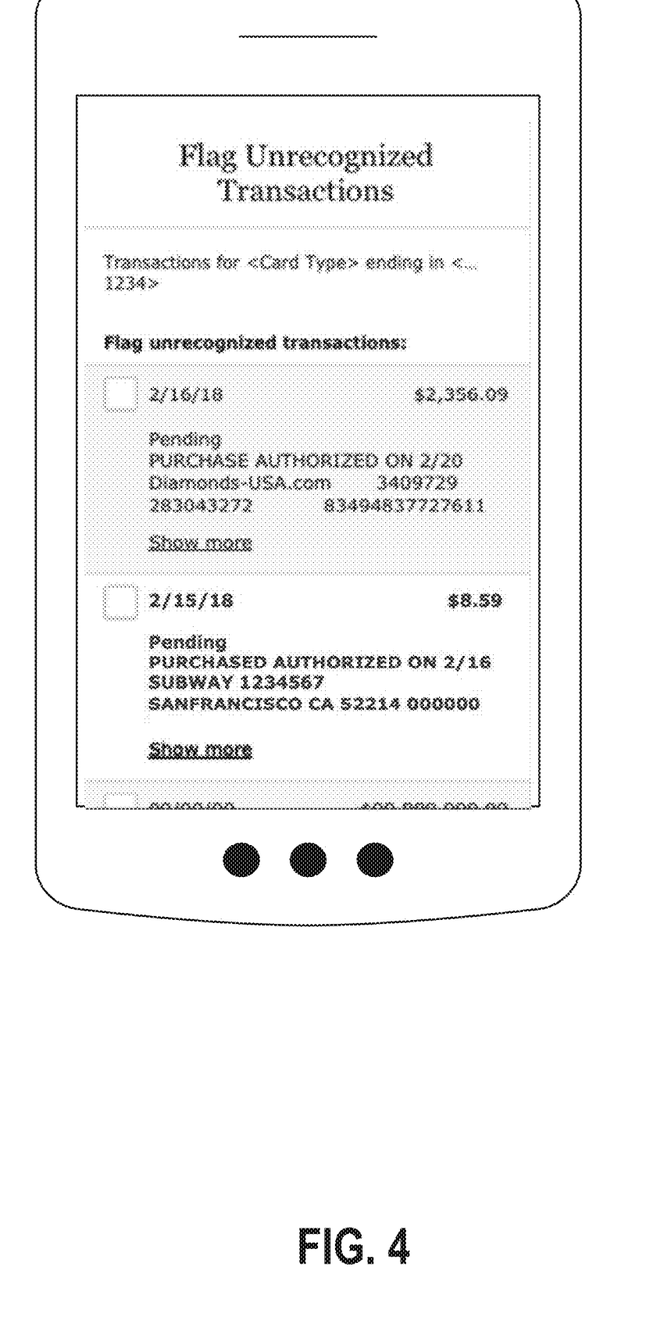
Figure 5:
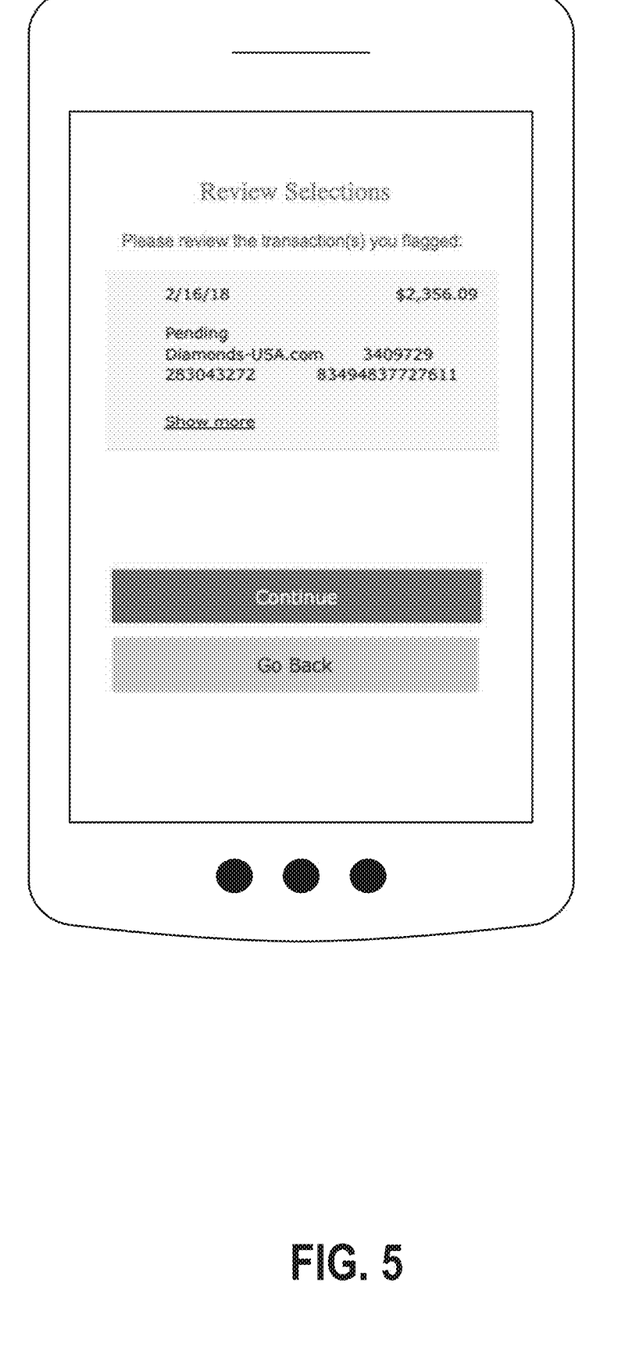

After successfully logging into mobile application 106, an interface such as presented in FIG. 4 may be presented. FIG. 4 displayed detailed information about the suspicious transaction. FIG. 4 also displays information about transactions that were not flagged. It is not uncommon for a system to recognize one suspicious transaction but fail to see another. By presenting a mixture of both flagged and non-flagged transactions, the user may identify additional unauthorized transactions. The transaction details may be received from transaction database 114. FIG. 5 illustrates an interface that confirms that selections made on the interface of FIG. 4.

Figure 6:
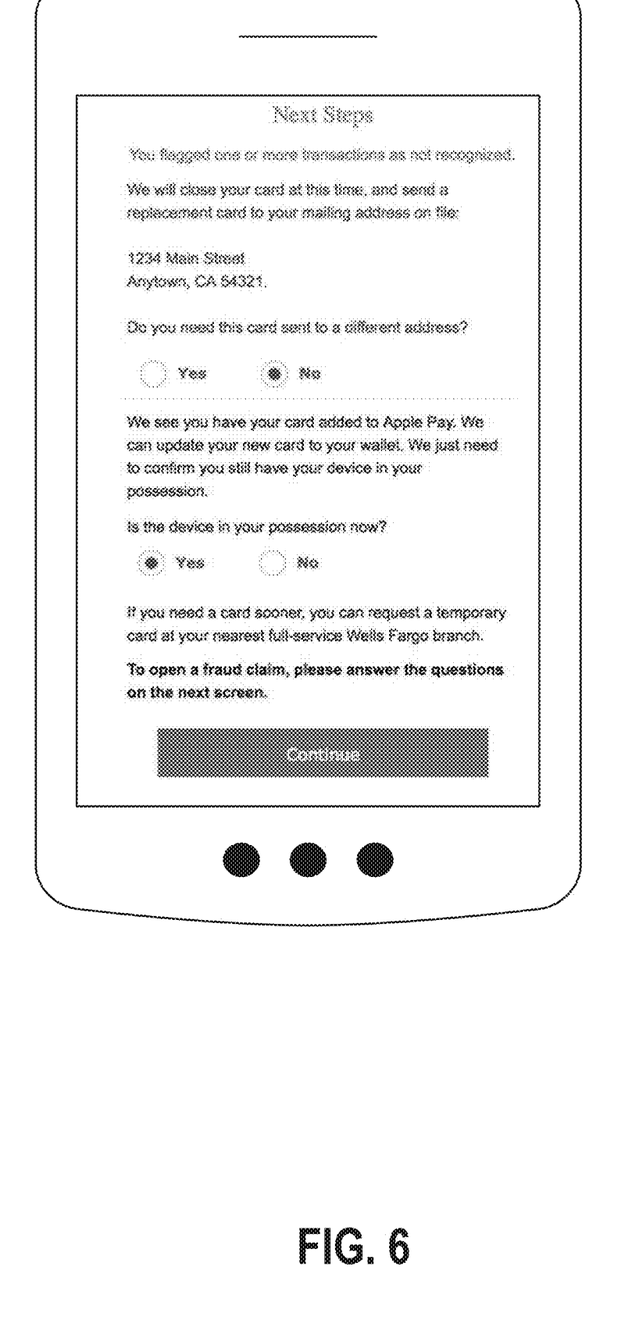

The screenshot of FIG. 6 illustrates the first stage of questions discussed previously. As illustrated these questions ask the user about ways to get a user new card as efficiently as possible. Some of the questions may only be selected for presentation if a biometric authentication was used. For example, the option to send a card to a different address than the one stored in user accounts 112 may not be shown if a biometric authentication was not used.

Figure 7A:
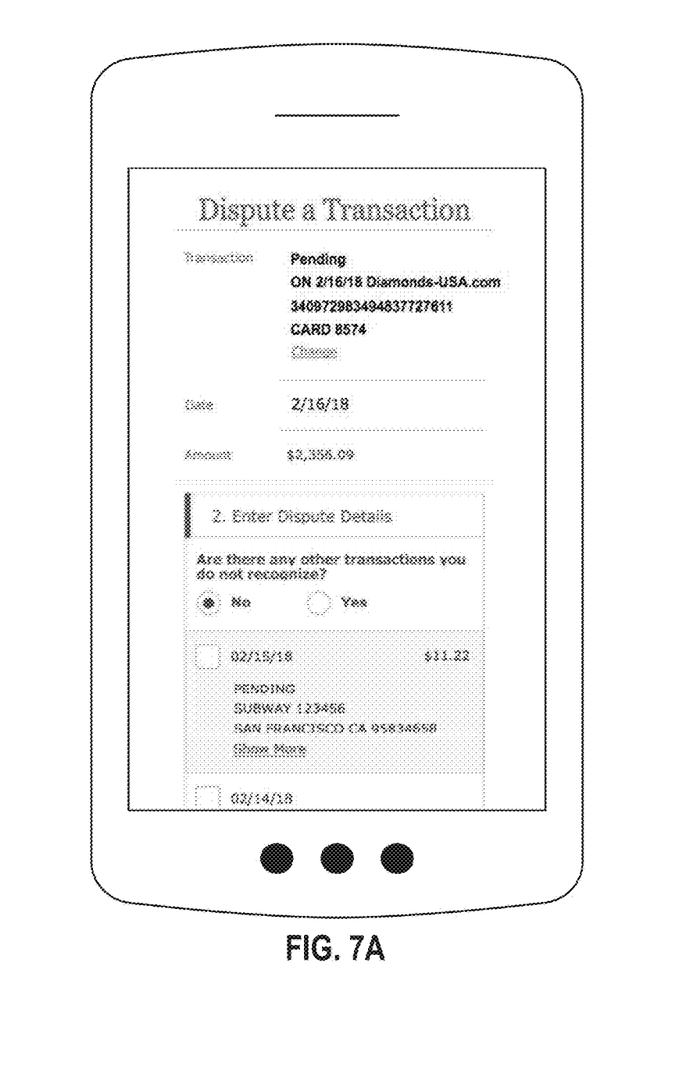
Figure 7B:
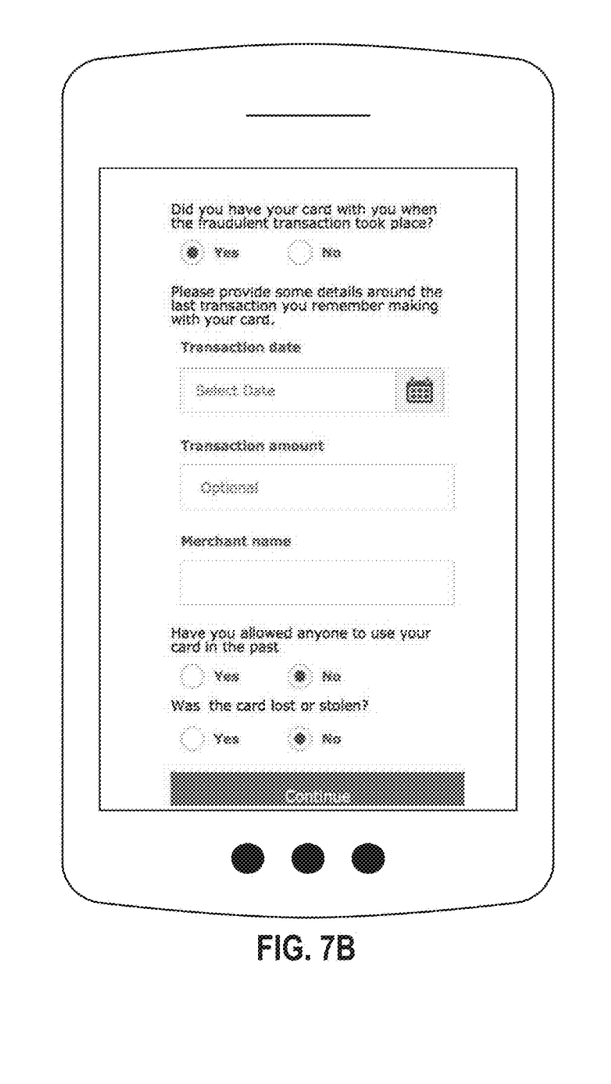

A sampling of some questions that may be presented to a user in the second stage of questions are presented in FIGS. 7A and 7B. The questions presented may be selected based on the output of machine learning model 120. For example, an input feature vector may be created based on the suspicious transaction details and account information of the user.

The output of machine learning model 120 may identify the probabilities that each question of a plurality questions is needed to resolve the suspicious transaction. If the probability of a question is above a threshold (e.g., 70%) the question may be presented to the user. If the question is one in which suspicious activity resolving system 102 already has the answer (e.g., something stored in transaction database 114 or user accounts 112) the answer may not be presented to the user.

Figure 8:
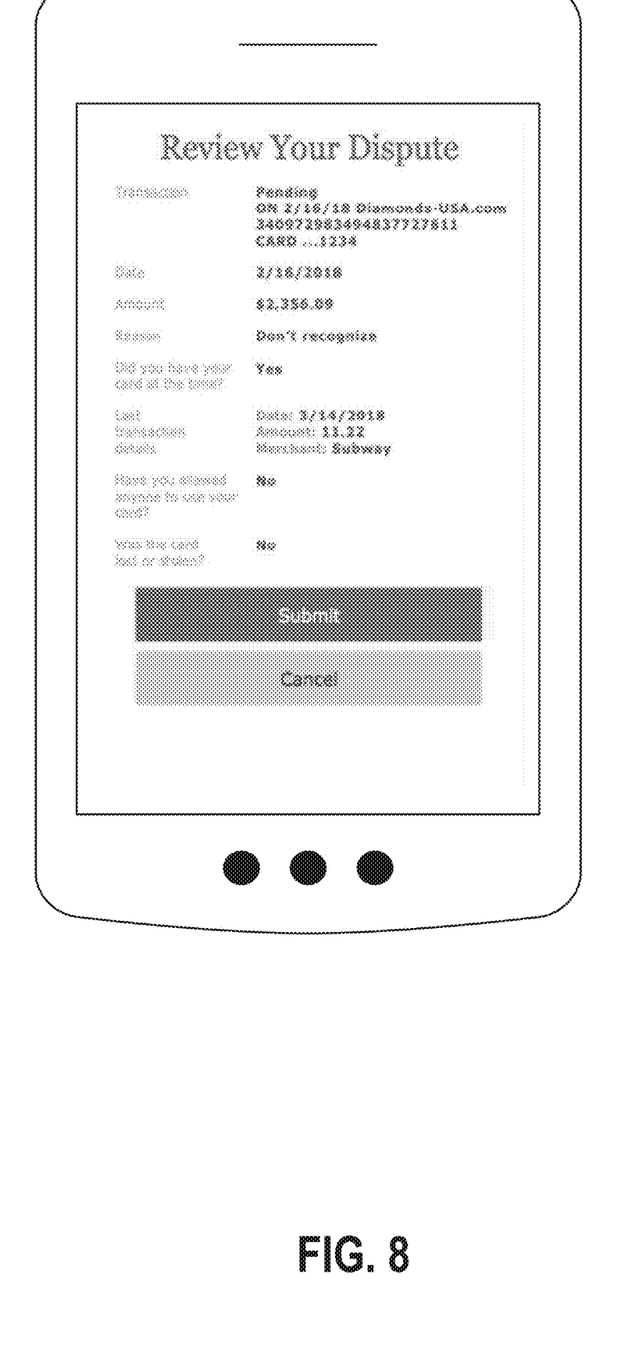
Figure 9:
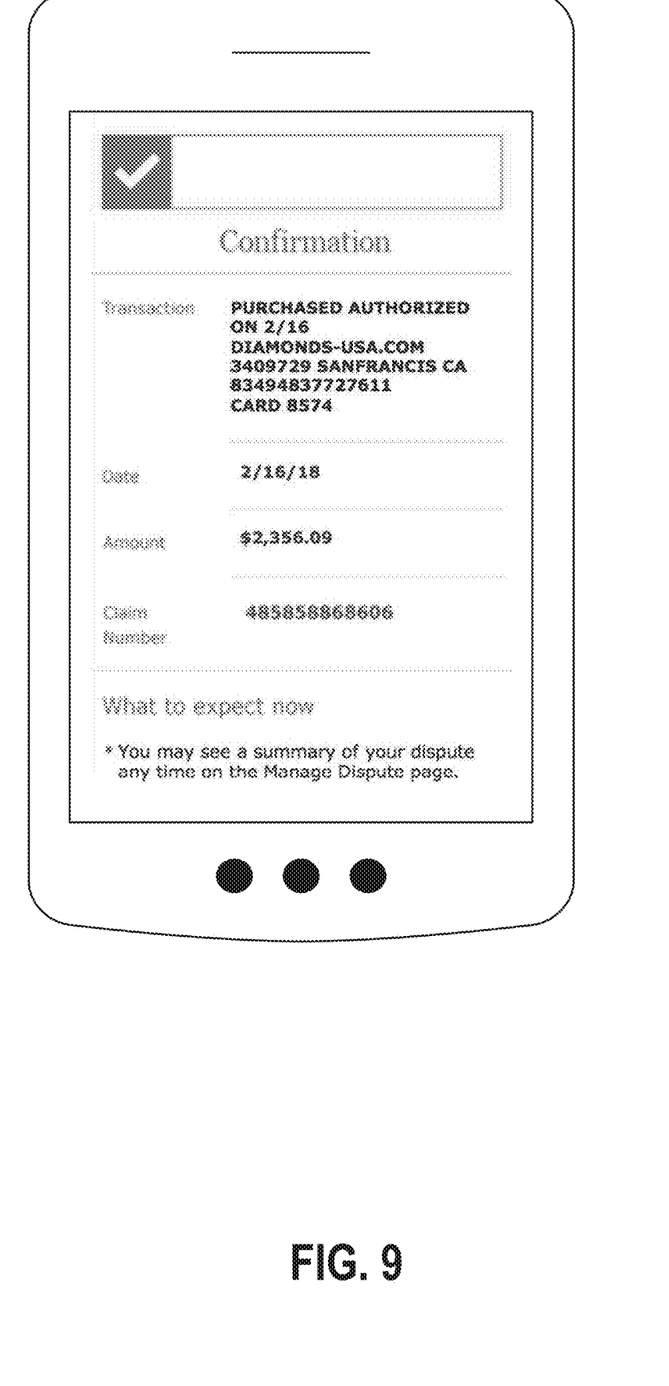

After answer the questions, an interface such as shown in FIG. 8 may be presented. FIG. 8 indicates a summary of the answers and gives the user the opportunity to revise/cancel the submission if needed. Otherwise, the user may submit the answers and a confirmation interface may be presented such as depicted in FIG. 9.

Figure 10:
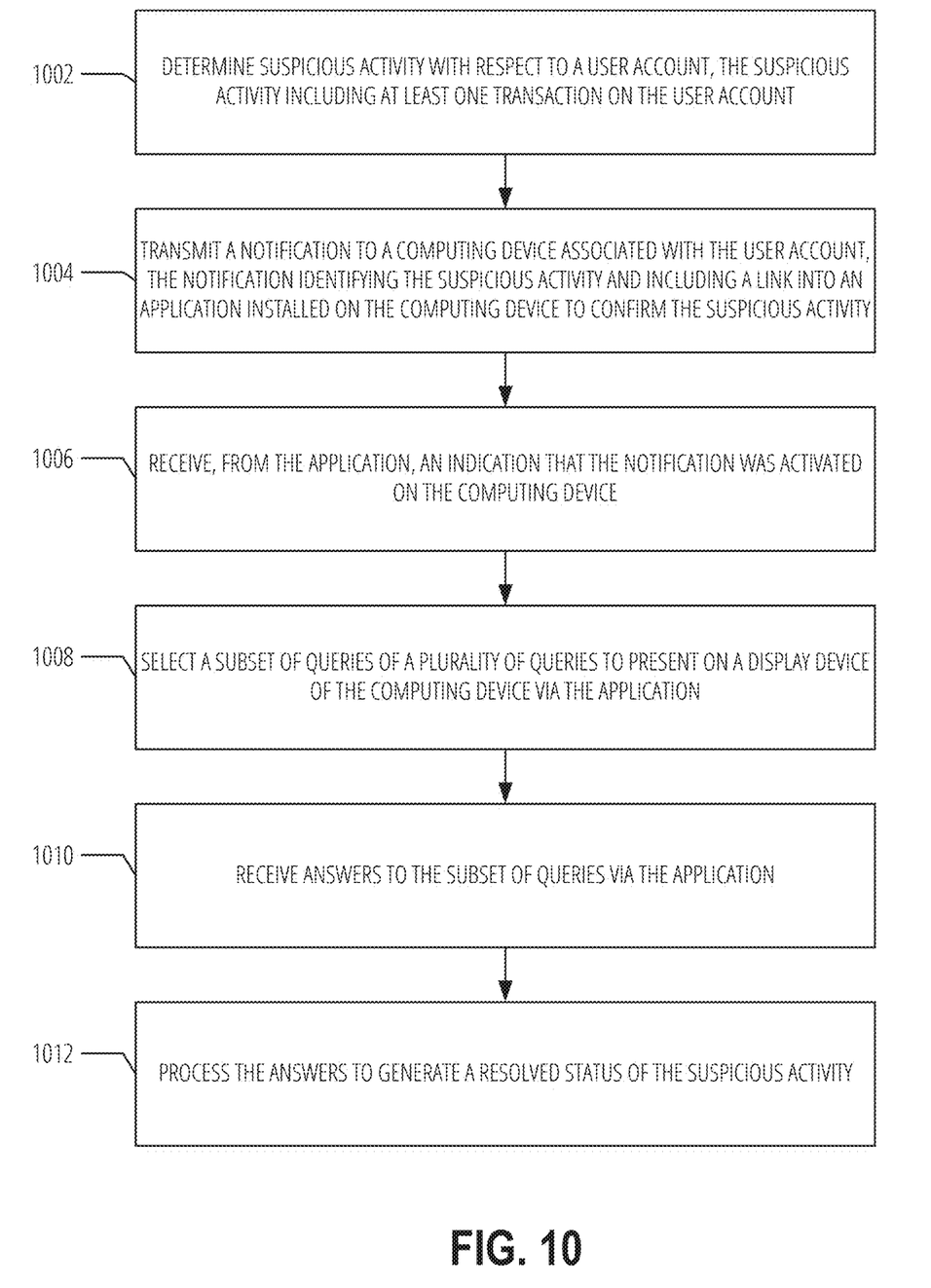
FIG. 10 is a flowchart diagram illustrating a method, according to various examples.

FIG. 10 is a flowchart illustrating a method, according to various examples. The method is represented as a set of blocks that describe operations 1002-1012 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 10. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In various examples, operation 1002, includes determining suspicious activity with respect to a user account. The suspicious activity may include at least one transaction on the user account. In some examples, the suspicious activity may be a suspicious event—e.g., suspicious logins or inquiries that occur out of normal range of time for user, at a frequency above a thresholder, at a location that the user has not logged in before, etc. The determining may be based on comparing an amount and location of a transaction with previous amounts and locations of transactions associated with the user account. The determining and remaining operations of the method of FIG. 10 may be performed on a system such as depicted in FIG. 1.

In various examples, operation 1004, includes transmitting a notification to a computing device associated with the user account. The notification may identify the suspicious activity or suspicious event and include a deep link into an application installed on the computing device to confirm the suspicious activity.

In various examples, operation 1006, includes receiving, from the application, an indication that the notification was activated on the computing device. For example, the system may receive an authentication request from the computing device. The authentication request may include an entered username and password in some instances. In other examples, a token may be received indicating that the user authenticated using a biometric login method on the computing device.

In various examples, operation 1008, includes in response to the indication: selecting a subset of queries of a plurality of queries to present on a display device of the computing device via the application. In some examples, a query of the plurality of queries may be selected based on an authentication method (e.g., biometric) performed on the computing device with respect to the application.

In various examples, the selecting the subset of queries may be based on an output of a machine learning model. The machine learning model may have been trained using previously resolved instances of suspicious activity for other transactions. Thus, the weights of nodes in the machine learning model may be based on the previously completed training.

The method may include inputting parameters of the suspicious activity or suspicious event into the machine learning model to obtain the output of the machine learning model. The parameters entered may be of the same type used to train the machine learning model. Parameters may include an amount of the suspicious activity, a date, a location, and previous transaction data of the user account. Inputting the parameters may include generating a feature vector with the parameters encoded in the feature vector.

In various examples, operation 1010, includes receiving answers to the subset of queries via the application. In various examples, operation 1012, includes processing the answers to generate a resolved status of the suspicious activity. Processing may include inputting the answers into a weighted formula where each component is associated with a question. Different processing engines may be used without departing from the scope of this disclosure. The resolved status may be to issue provisional credit to the user base on the processing resulting in score between two values (e.g., if the possible ranges are 1-10, provisional credit may be for scores 3-7). The resolved status may be stored with a claim number in transaction database 114 in various examples. The user may request the status of the transaction via the mobile application in various examples.

In various examples, the method may include, in response to the indication at operation 1006, presenting details of the suspicious activity in the application with details of another transaction that has not been determined as suspicious before the selecting. The details may include a date of the suspicious activity.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 11:
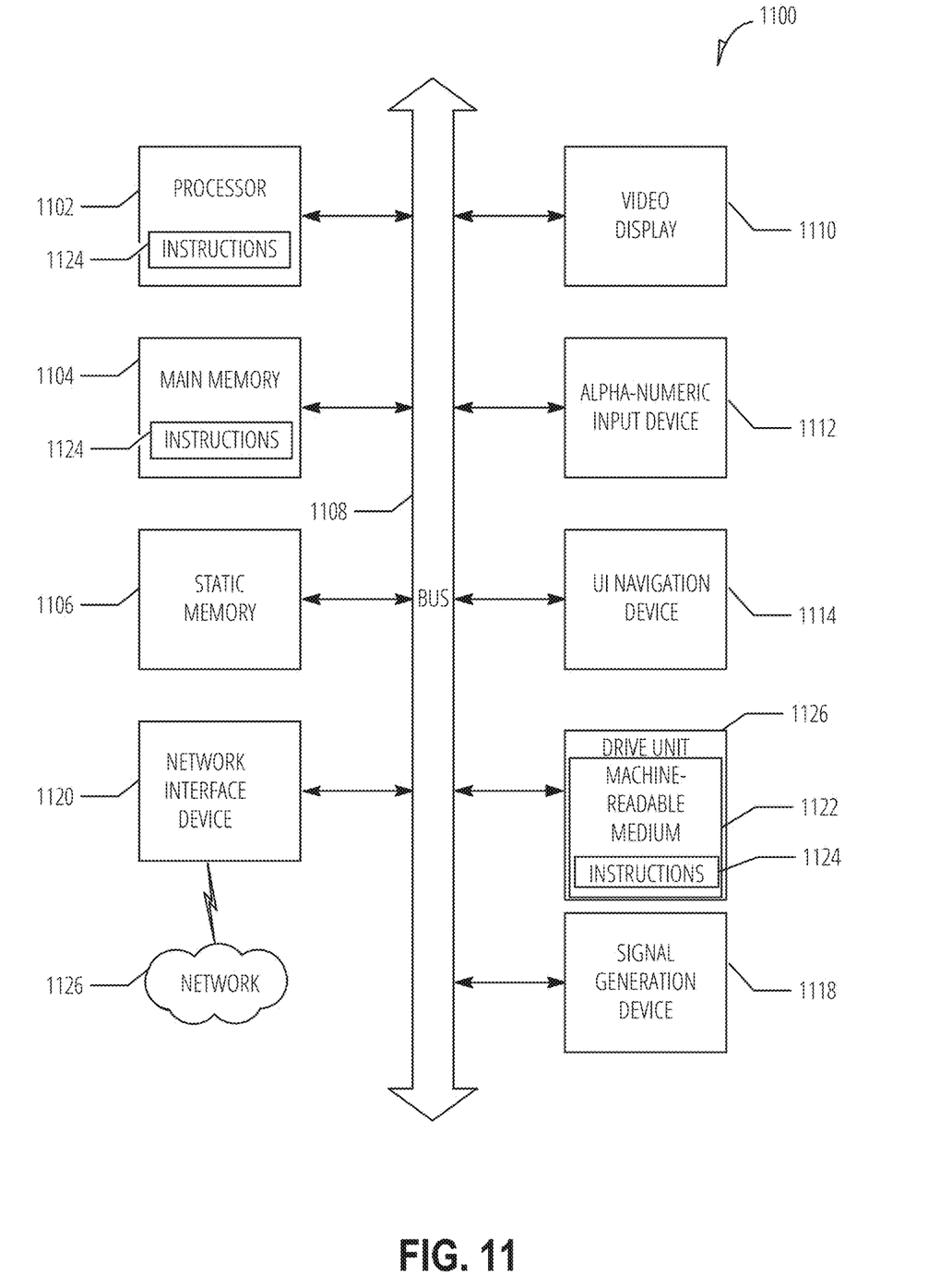
FIG. 11 is a block diagram illustrating an example machine upon which any one or more of the techniques (e.g., methodologies) discussed herein may be performed, according to an example embodiment.

FIG. 11 is a block diagram illustrating a machine in the example form of a computer system 1100, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1100 includes at least one processor 1102 (e.g., a central processing unit (CPU), a graphics processing unit (GPU) or both, processor cores, compute nodes, etc.), a main memory 1104 and a static memory 1106, which communicate with each other via a link 1108 (e.g., bus). The computer system 1100 may further include a video display unit 1110, an alphanumeric input device 1112 (e.g., a keyboard), and a user interface (UI) navigation device 1114 (e.g., a mouse). In one embodiment, the video display unit 1110, input device 1112 and UI navigation device 1114 are incorporated into a touch screen display. The computer system 1100 may additionally include a storage device 1116 (e.g., a drive unit), a signal generation device 1118 (e.g., a speaker), a network interface device 1120, and one or more sensors (not shown), such as a global positioning system (GPS) sensor, compass, accelerometer, or other sensor.

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the computer system 1100, with the main memory 1104, static memory 1106, and the processor 1102 also constituting machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
    determining suspicious activity with respect to a financial user account, the suspicious activity including at least one purchase transaction on the financial user account, the at least one purchase transaction including an amount;
    transmitting a notification to a computing device associated with the financial user account, the notification identifying the suspicious activity and including a link into an application installed on the computing device to confirm the suspicious activity;
    receiving, from the application, an indication that the link included in the notification was activated on the computing device; and
    in response to receiving the indication:
        generating an input feature vector using parameters of the suspicious activity, the parameters including the amount of a purchase transaction of the at least one purchase transaction, an encoding of a location of the purchase transaction, and an encoding of whether another suspicious transaction was detected within a threshold amount of time;
        inputting the input feature vector into a machine learning model;
        after the inputting, receiving an output from the machine learning model, the output formatted as an output vector, where each parameter of the output vector corresponds to a possible query;
        selecting a subset of queries of a plurality of queries, based on the output vector, to present on a display device of the computing device via the application;
        receiving answers to the subset of queries via the application; and
        processing the answers to generate a resolved status of the suspicious activity.

2. The method of claim 1, further comprising in response to the indication:
    presenting details of the suspicious activity in the application with details of another transaction that has not been determined as suspicious before the selecting.

3. The method of claim 2, wherein the details include a date of the suspicious activity.

4. The method of claim 1, wherein the method further includes inputting past user behavior into the machine learning model to obtain the output of the machine learning model.

5. The method of claim 1, wherein weights of nodes within the machine learning model are based on previously resolved instances of suspicious activity for other transactions.

6. The method of claim 1, wherein the selecting the subset of queries of the plurality of queries comprises selecting a query of the plurality of queries based on an authentication method performed on the computing device with respect to the application.

7. A non-transitory computer readable medium comprising instructions, which when executed by at least one processor, configure the at least one processor to perform operations comprising:
    determining suspicious activity with respect to a financial user account, the suspicious activity including at least one purchase transaction on the financial user account, the at least one purchase transaction including an amount;
    transmitting a notification to a computing device associated with the financial user account, the notification identifying the suspicious activity and including a link into an application installed on the computing device to confirm the suspicious activity;

receiving, from the application, an indication that the notification was activated on the computing device; and in response to receiving the indication:
  generating an input feature vector using parameters of the suspicious activity, the parameters including the amount of a purchase transaction of the at least one purchase transaction, an encoding of a location of the purchase transaction, and an encoding of whether another suspicious transaction was detected within a threshold amount of time:
  inputting the input feature vector into a machine learning model;
  after the inputting, receiving an output from the machine learning model, the output formatted as an output vector, where each parameter of the output vector corresponds to a possible query;
  selecting a subset of queries of a plurality of queries, based on the output vector, to present on a display device of the computing device via the application;
  receiving answers to the subset of queries via the application; and
  processing the answers to generate a resolved status of the suspicious activity.

8. The computer readable medium of claim 7, wherein the operations further comprise in response to the indication:
  presenting details of the suspicious activity in the application with details of another transaction that has not been determined as suspicious before the selecting.

9. The computer readable medium of claim 8, wherein the details include a date of the suspicious activity.

10. The computer readable medium of claim 7, wherein the operations further include inputting past user behavior into the machine learning model to obtain the output of the machine learning model.

11. The computer readable medium of claim 7, wherein weights of nodes within the machine learning model are based on previously resolved instances of suspicious activity for other transactions.

12. The computer readable medium of claim 7, wherein the selecting the subset of queries of the plurality of queries comprises selecting a query of the plurality of queries based on an authentication method performed on the computing device with respect to the application.

13. A system comprising:
at least one processor; and
a storage device comprising instructions, which when executed by the at least one processor, configure the at least one processor to perform operations comprising:
determining suspicious activity with respect to a financial user account, the suspicious activity including at least one purchase transaction on the financial user account, the at least one purchase transaction including an amount;
transmitting a notification to a computing device associated with the financial user account, the notification identifying the suspicious activity and including a link into an application installed on the computing device to confirm the suspicious activity;
receiving, from the application, an indication that the notification was activated on the computing device; and
in response to receiving the indication:
  generating an input feature vector using parameters of the suspicious activity, the parameters including the amount of a purchase transaction of the at least one purchase transaction, an encoding of a location of the purchase transaction, and an encoding of whether another suspicious transaction was detected within a threshold amount of time;
  inputting the input feature vector into a machine learning model;
  after the inputting, receiving an output from the machine learning model, the output formatted as an output vector, where each parameter of the output vector corresponds to a possible query;
  selecting a subset of queries of a plurality of queries, based on the output vector, to present on a display device of the computing device via the application;
  receiving answers to the subset of queries via the application; and
  processing the answers to generate a resolved status of the suspicious activity.

14. The system of claim 13, wherein the operations further comprise in response to the indication:
  presenting details of the suspicious activity in the application with details of another transaction that has not been determined as suspicious before the selecting.

15. The system of claim 14, wherein the details include a date of the suspicious activity.

* * * * *